United States Patent
Angelica (10) Patent No.: US 9,767,717 B1
(45) Date of Patent: Sep. 19, 2017

(54) METHOD AND SYSTEM FOR MANAGING A CRITICAL INCIDENT OPERATION

(71) Applicant: Michael B Angelica, Miami, FL (US)

(72) Inventor: Michael B Angelica, Miami, FL (US)

(*) Notice: Subject to any disclaimer, the term of this patent is extended or adjusted under 35 U.S.C. 154(b) by 115 days.

(21) Appl. No.: 14/803,470

(22) Filed: Jul. 20, 2015

Related U.S. Application Data (60) Provisional application No. 62/026,848, filed on Jul. 21, 2014.

(51) Int. Cl.
| | | |
|---|---|---|
| *G06F 7/00* | (2006.01) | |
| *G09F 7/00* | (2006.01) | |
| *B60R 9/00* | (2006.01) | |
| *F16B 1/00* | (2006.01) | |
| *F16M 11/04* | (2006.01) | |
| *G09F 7/18* | (2006.01) | |

(52) U.S. Cl.
CPC ............. *G09F 7/00* (2013.01); *B60R 9/00* (2013.01); *F16B 1/00* (2013.01); *F16M 11/041* (2013.01); *G09F 7/002* (2013.01); *G09F 7/18* (2013.01); *F16B 2001/0035* (2013.01); *G09F 2007/1852* (2013.01); *G09F 2007/1865* (2013.01)

(58) Field of Classification Search
CPC ....... G09F 21/04; G09F 2021/041; G09F 7/04
See application file for complete search history.

(56) References Cited

U.S. PATENT DOCUMENTS

| | | | | |
|---|---|---|---|---|
| 3,629,756 A | * | 12/1971 | Holtz | H01F 7/0215 101/389.1 |
| 4,946,039 A | | 8/1990 | Garran | |
| 4,972,616 A | * | 11/1990 | Doll | G09F 3/04 40/607.05 |
| 5,575,107 A | * | 11/1996 | Doerr | G09F 3/04 206/423 |
| 5,683,114 A | | 11/1997 | Lauer et al. | |
| 5,705,980 A | | 1/1998 | Shapiro | |
| 5,732,978 A | | 3/1998 | Tunnell, IV | |
| 6,236,330 B1 | | 5/2001 | Cohen | |
| 8,311,510 B2 | | 11/2012 | Cradick | |
| 8,566,023 B2 | | 10/2013 | Riggins et al. | |
| 2005/0252053 A1 | * | 11/2005 | Pena | G09F 21/04 40/591 |
| 2006/0059744 A1 | * | 3/2006 | Wescott | G09F 7/00 40/584 |
| 2006/0118636 A1 | | 6/2006 | Miles et al. | |

(Continued)

*Primary Examiner* — Cassandra Davis
(74) *Attorney, Agent, or Firm* — H. John Rizvi; Gold & Razvi, P.A.

(57) ABSTRACT

A method and system for managing law enforcement critical incident operations at a scene of the critical incident is described, including at least one writable panel adapted and constructed to be transported to the scene of the critical incident and to contain relevant information related to a critical incident. A plurality of matching portable forms contains a copy of an entire panel or part of a panel. The forms can be color-coded in the same way as the matching panel or part of a panel. The portable forms are constructed to be transported to the scene of the critical incident, and handed out to field officers at the scene of the critical incident. The officers can write information on the portable forms while executing the operation, and through the forms provide rapid and efficient feedback to a commander who is coordinating the operation with help of the matching panels.

11 Claims, 7 Drawing Sheets

(56) References Cited

U.S. PATENT DOCUMENTS

2007/0044033 A1     2/2007   Larsen
2007/0261279 A1   11/2007   Wolfe
2015/0342372 A1* 12/2015   Chafe .................. A47G 1/1606
                                                                            40/711

* cited by examiner

METHOD AND SYSTEM FOR MANAGING A CRITICAL INCIDENT OPERATION

CROSS-REFERENCE TO RELATED APPLICATION

This application claims the benefit of U.S. Provisional Patent Application Ser. No. 62/026,848, filed Jul. 21, 2014, which is incorporated herein in its entirety.

FIELD OF THE INVENTION

The present invention relates generally to managing law enforcement critical incident operations, and more particularly, to a method and system of managing law enforcement critical incident operations that facilitates the central planning and dissemination of commands during a critical incident, and the processing of feedback from the officers executing the commands.

BACKGROUND OF THE INVENTION

Since the onset of the modern police department in the early 18$^{th}$ Century, specialized law enforcement units have been formed to deal with various aspects of maintaining public order. From mounted police to riot squads to SWAT teams, the nature and number of specialized law enforcement units vary with the needs of the jurisdiction. In the face of several highly publicized crisis incidents in the early 1990's, the FBI formed the Critical Incident Response Group (CIRG) to handle crises such as hostage or siege situations.

The CIRG, as a part of the Criminal, Cyber, Response, and Services Branch of the FBI, serves to bring together a spectrum of resources from a wide variety of FBI Sections. Consequently, the CIRG encompasses investigative, tactical, intelligence, surveillance, and operational functions to provide immediate response from law enforcement authorities in critical incidents.

Following the example of the FBI, most local law enforcement agencies have established their own critical incident response teams. Although these teams take many different forms, the typical procedures in critical incident management take on the same general form. In order to resolve a critical incident, a law enforcement agency sets up an "operation" involving various law enforcement officers and one or more supervisors (critical incident operation commanders). The commander generally remains in one location, while the officers are dispersed to various locations in order to carry out different actions and eventually resolve the critical incident. The commander receives feedback from the officers and uses the feedback information to make relevant decisions regarding the critical incident operation. Communication between the commander and the officers generally takes place in person, over dedicated radiofrequency communication devices, or over terminal devices connected to public voice and/or data communication networks.

A critical incident is an inherently stressful and complex situation, and critical incident response teams include a relatively large number of responders. Critical incident response teams often involve interagency collaboration, which means that the commander must coordinate efforts among personnel not necessarily accustomed to working with one another on a regular basis. These factors increase the risk for miscommunication during times when precise and well-coordinated effort is critical. Unfortunately, there are no special tools in the art for assisting a Critical Incident Operation commander in processing the information received from the officers, and in delivering comprehensive and structured instructions to the officers. In fact, normally, the commander simply carries a paper pad and pen, and takes notes while providing instructions and receiving feedback to and from his subordinate officers.

Accordingly, there is an established need for a readily transportable system and method for facilitating the management of law enforcement critical incident operations that will allow a Critical Incident Operation commander to disseminate instructions in an efficient, clearly understandable, and documentable fashion, and to rapidly process feedback from the officers, allowing to make faster and more documented decisions.

SUMMARY OF THE INVENTION

The present invention is directed to a system of managing law enforcement critical incident operations at a scene of the critical incident. The system includes at least one writable panel adapted and constructed to be transported to the scene of the critical incident and to contain relevant information related to a critical incident. A plurality of matching portable forms, for instance made of paper, is associated with the at least one panel. Each form is adapted and constructed to be transported to the scene of the critical incident, and to contain at least a part of the information contained on a writable panel. The forms are distributed to critical incident field officers at the scene of the critical incident. The officers can use the forms to easily comprehend the operation-guiding panels and rapidly provide feedback to an operation commander to copy on the panels. The system can further include a support assembly for mounting the at least one writable panel. The support assembly is also adapted and constructed to be transported to the scene of the critical incident. The at least one writable panel can be secured to the support assembly.

The present invention provides a readily transportable system and method for facilitating the management of law enforcement critical incident operations that will allow a Critical Incident Operation commander to disseminate instructions in an efficient, clearly understandable, and documentable fashion.

The present invention provides a system and method for facilitating accessing and distributing relevant information related to a critical incident, and assisting the commander in organizing operation planning by receiving information in standardized formats. Such information includes, but is not limited to, diagrams, charts, operational objectives, checklists, reminders, names, phone numbers, perimeters, subject information, information regarding injured victims and their locations, rally points, search patterns, and triage locations. The critical incident operation commander can read information on the panels in order to make decisions or provide instructions, and can write information on the panels in dependence of the feedback the commander receives from the officers.

Introducing a first implementation of the invention, the present invention consists of a system for managing a critical incident operation for use at a remote incident site, the system comprising a support unit including at least one panel mounting element, and at least one panel having an attachment element. The attachment element is engageable to at least one panel mounting element of the support unit. The at least one panel further includes a writable surface wherein at least a portion of the writable surface has printed thereon relevant information to critical incident management. The system further includes a plurality of portable forms, sized smaller than the at least one panel, wherein each form of the plurality of forms has printed thereon a reproduction of a subset of the relevant information to critical incident management printed on a corresponding specific panel of the at least one panel.

In another aspect, the at least one panel can be sized to fit in a vehicle.

In another aspect, the at least one panel can be waterproof.

In another aspect, the critical incident management information on the at least one panel can be color-coded, and the information subset on each form of the plurality of forms can be color-coded to match the relevant information to critical incident management printed on the corresponding specific panel.

In another aspect, the relevant information can include at least one of the group consisting of diagrams, charts, operational objectives, checklists, reminders, names, phone numbers, perimeters, subject information, information regarding injured victims and their locations, rally points, search patterns, and triage locations.

In another aspect, the support unit can include a vehicle attachment portion attachable to an exterior of a vehicle, and a support assembly attachable to the vehicle attachment portion, the support assembly including the at least one panel mounting element.

In another aspect, the support assembly can be removable from the vehicle attachment portion.

In another aspect, the support assembly can be an elongated beam.

In another aspect, the panel mounting element can be made from a magnetic material, and the attachment element of the at least one panel can be at least one of a magnetic material and a ferrous material compatible with the magnetic material of the panel mounting element.

In another aspect, the panel mounting element can be made from a ferrous material, and the attachment element of the at least one panel can be a magnetic material compatible with the ferrous material.

In another aspect, the panel mounting element can include at least one attachment hook.

In another aspect, the attachment element of the at least one panel can include at least one attachment aperture, each attachment aperture engaging one of the at least one attachment hook.

In another aspect, the support unit can include at least one support assembly having a plurality of support legs secured to a panel support ledge and a rear support structure extending upwardly therefrom.

Introducing another implementation of the invention, the present invention consists of a system for managing a critical incident operation for use at a remote incident site, the system comprising a support unit comprising at least one panel mounting element, and at least one panel having an attachment element. The attachment element is engageable to at least one panel mounting element of the support unit. The at least one panel further includes a writable surface wherein at least a portion of the writable surface has printed thereon relevant information to critical incident management. The system further includes a plurality of portable forms, sized smaller than the at least one panel. Each form of the plurality of forms has a writable form surface having printed thereon a reproduction of a subset of the relevant information to critical incident management printed on a corresponding specific panel of the at least one panel. The at least one panel can adopt an installed position on the support unit in which the at least one panel is arranged in an upright position.

In yet another aspect of the present invention, the present invention consists of a method for managing a critical incident operation at a remote incident site, the method comprising a step of acquiring a critical incident management system including: a support unit comprising at least one panel mounting element; at least one panel having an attachment element, the attachment element engageable to at least one panel mounting element of the support unit, the at least one panel further having a writable surface wherein at least a portion of the writable surface has printed thereon relevant information to critical incident management; and a plurality of portable forms, sized smaller than the at least one panel, wherein each form of the plurality of forms has printed thereon a reproduction of a subset of the relevant information to critical incident management printed on a corresponding specific panel of the at least one panel. The critical incident management system is transported in a law enforcement vehicle to the scene of a critical incident, and the at least one panel is mounted onto the at least one panel mounting element of the support unit. Then, portable forms matching the panels or portions of the panels, and optionally color-coded as the matching panels or portions of the panels, are distributed to relevant law enforcement personnel. During the critical incident operation, a law enforcement officer or commander identifies a section of a specific form of the plurality of portable forms distributed to relevant law enforcement personnel as having been partially or fully completed by a writing on the section. Then, the law enforcement officer or commander identifies a destination panel among the at least one panel, the destination panel comprising printed relevant information to critical incident management of which the section of the form is a reproduction thereof. Once the destination panel has been identified, the law enforcement officer or commander reproduces the writing on the section onto the destination panel, by writing on the printed relevant information to critical incident management provided on the writable surface of the destination panel in correspondence with the writing on the section.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward managing law enforcement critical incident operations, and more particularly, to a method and system of managing law enforcement critical incident operations that facilitates the central planning and dissemination of commands during a critical incident.

Figure 1:
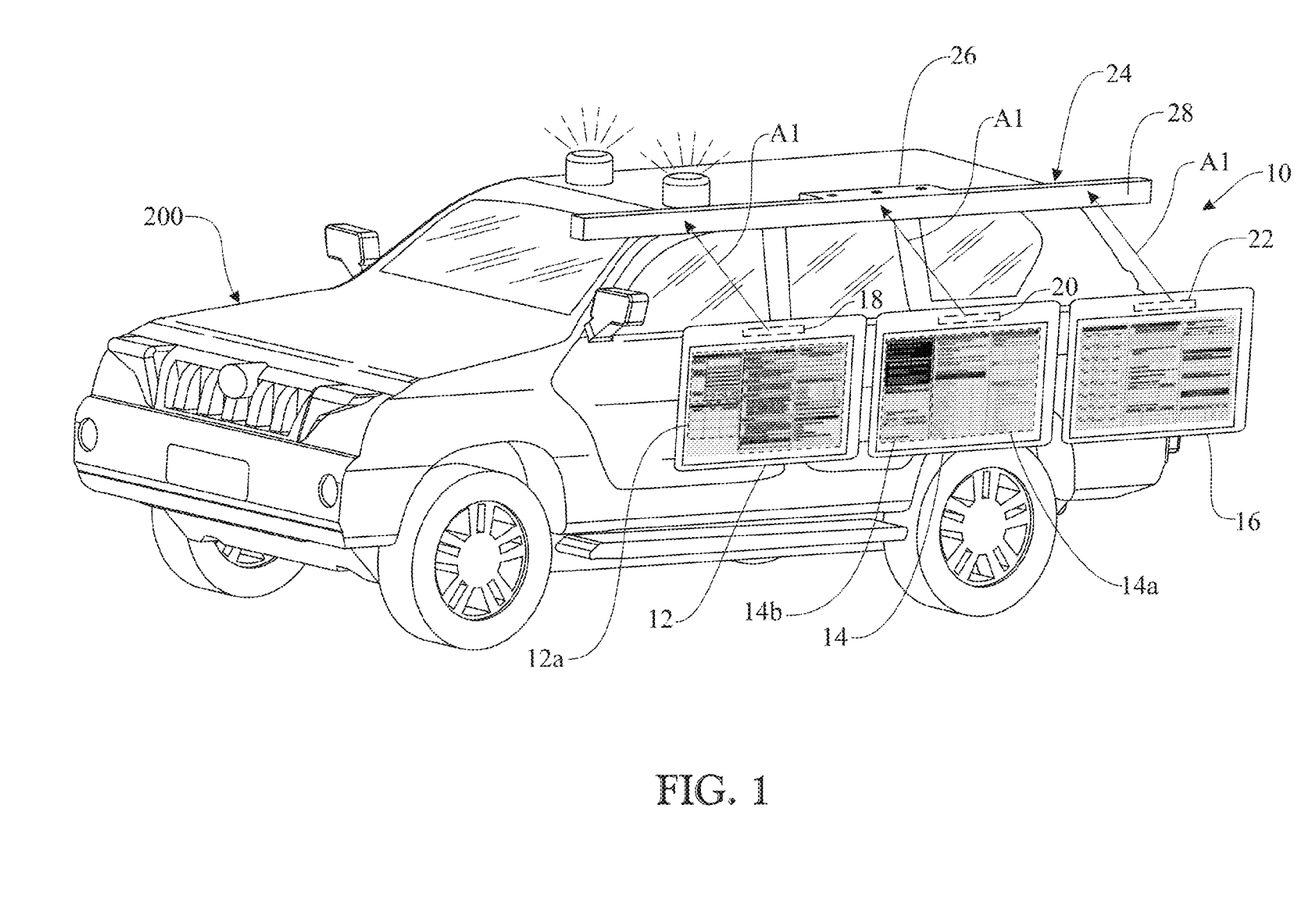
FIG. 1 presents a perspective isometric view of an exemplary law enforcement vehicle provided with a support bar, to which three waterproof panels are about to be affixed in accordance with a first embodiment of the invention.
Figure 2:
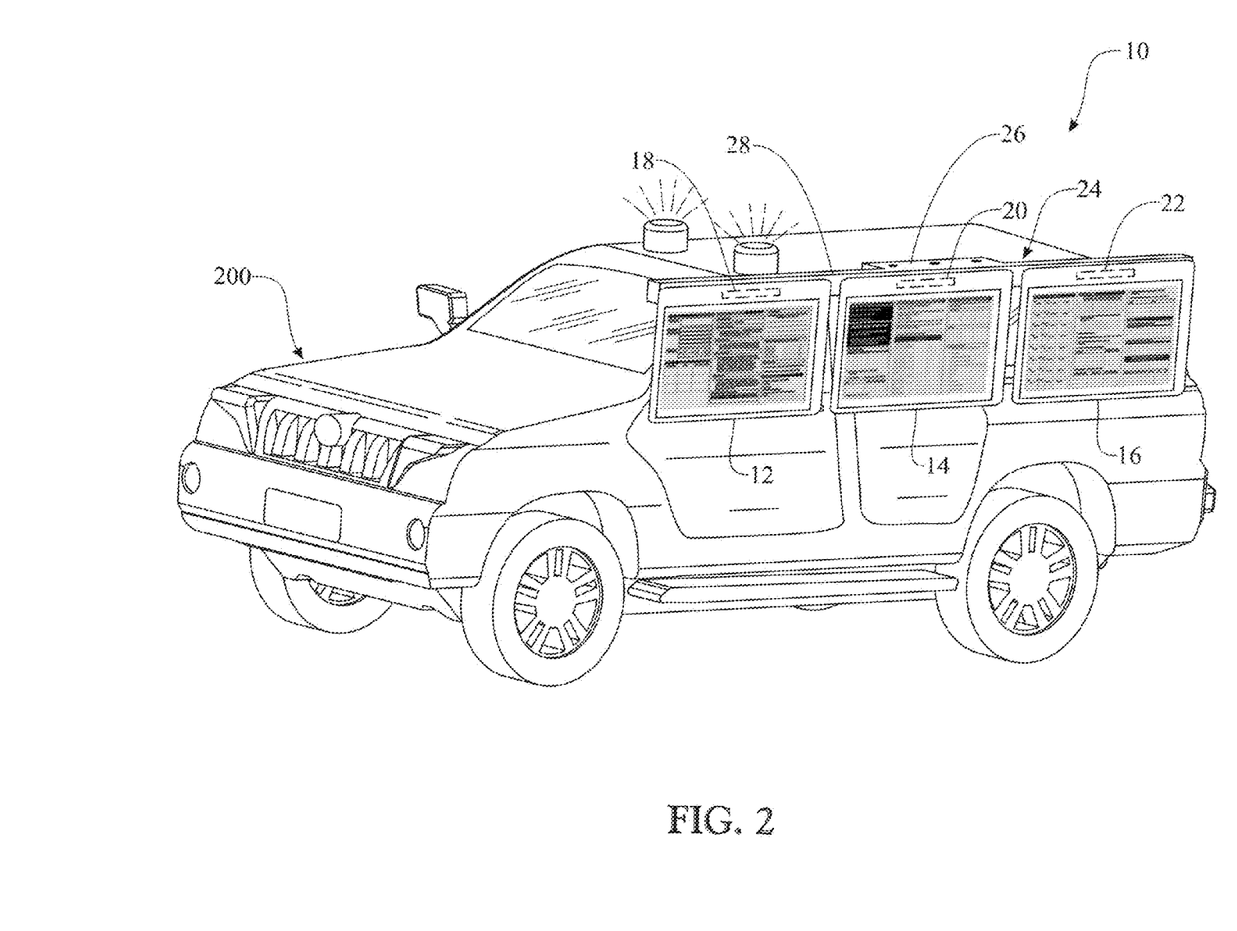
FIG. 2 presents an isometric view of the vehicle of FIG. 1, having magnetically attached the panels onto the supporting bar installed on the vehicle.

Referring now to FIGS. 1 and 2, a system 10 of managing law enforcement critical incident operations at a scene of a critical incident is associated with a law enforcement vehicle 200. The system 10 includes a plurality of writable panels 12, 14, 16. The panels 12, 14, 16 can be provided with a suitable writable surface, such as a waterproof, laminated whiteboard. The panels 12, 14, 16 are sized and configured so as to be readily transported to the scene of the critical incident, and preferably to fit inside a vehicle without deforming the panels 12, 14, 16; for example, the panels 12, 14, 16 are sized to fit in a trunk or storage area of the vehicle 200.

The panels 12, 14, 16 contain relevant information related to a critical incident to assist the commander in organizing operation planning by entering information into standardized formats. Such information can include, without limitation, diagrams, charts, operational objectives, checklists, reminders, names, phone numbers, perimeters, subject information, information regarding injured victims and their locations, rally points, search patterns, and triage locations. The critical incident operation commander can read information on the panels in order to make decisions or provide instructions, and can write information on the panels in dependence of the feedback the commander receives from the officers. The information on the panels 12, 14, 16 can be color-coded, for instance by having different-colored sections within a panel, or different-colored panels, allowing the critical incident operation commander to quickly find a specific section or panel using color as a reference.

Each of the panels 12, 14, 16 includes an attachment element 18, 20, 22. In the embodiment illustrated in FIGS. 1 and 2, the attachment elements 18, 20, 22 are provided as magnetic elements. In different embodiments of the invention, the magnetic elements can be adhered to a rear face or a front face of the panels 12, 14, 16. In alternative embodiments, the magnetic elements can be embedded inside the panels 12, 14, 16.

The system 10 of the present embodiment includes a support assembly 24 for securing the panels 12, 14, 16 to the vehicle 200. The support assembly 24 is transported to the scene of the critical incident by virtue of being secured to the law enforcement vehicle 200. In alternative embodiments, the support assembly 24 can be removable, transported in the trunk of the vehicle 200 and only mounted on the outside of the vehicle 200 when the vehicle 200 has reached the scene of the critical incident. The support assembly 24 includes a vehicle attachment portion 26 securable to the law enforcement vehicle 200. A panel mounting element 28 is connected to the vehicle attachment portion 26. In the embodiment illustrated in FIGS. 1 and 2, the panel mounting element 28 is fabricated to interface with the magnetic attachment elements 18, 20, 24. For instance, the panel mounting element 28 is made from a ferrous metal such as steel, or is itself magnetic and has a polarity opposite to that of the attachment elements 18, 20, 24.

Once the law enforcement vehicle 200 is stationed at the scene of a critical incident, the panels 12, 14, 16 are removed from the storage area of the vehicle 200. The panels 12, 14, 16 are then moved towards the panel mounting element 28, such as in the direction of arrows A1, to bring the magnetic attachment elements 18, 20, 24 into contact with the panel mounting element 28, securing the panels 12, 14, 16 in their in-use position as illustrated in FIG. 2.

In the present embodiment, the panel mounting element 28 takes the shape of a beam, which can present a fixed length or, alternatively, be adjustable in length (e.g. telescopic). The horizontal beam can be placed generally above the vehicle side windows, in a horizontal and longitudinal direction along the side of the vehicle. In consequence, the panels 12, 14, 16 can be attached to the panel mounting element 28 in a horizontally and longitudinally aligned arrangement, as shown in FIG. 2, maximizing the number of panels that are attachable to the vehicle without extending substantially from the vehicle as observed in plan view, and also allowing for all panels 12, 14, 16 to remain substantially at eye level to the persons involved in the operation.

Figure 3:
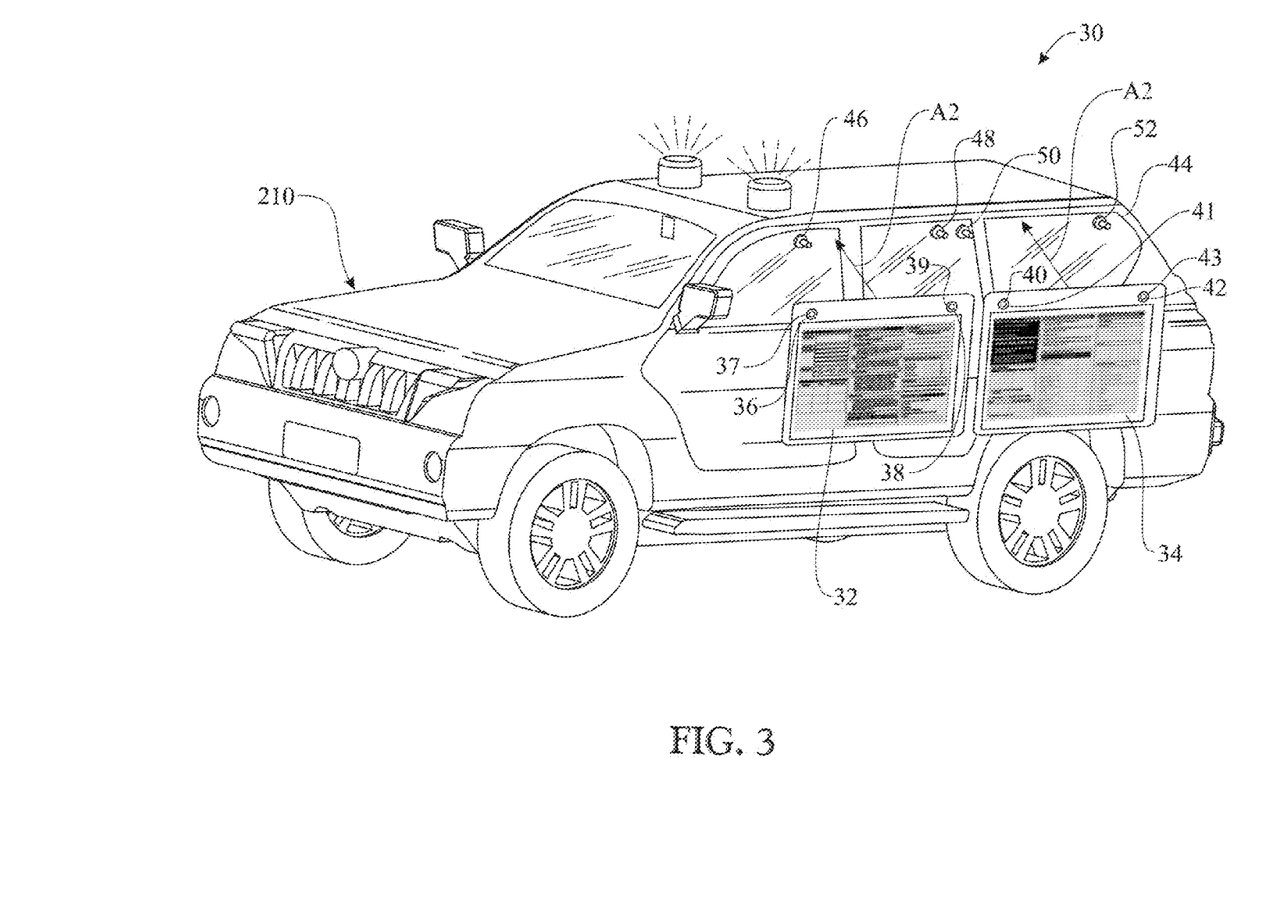
FIG. 3 presents an isometric view of an exemplary law enforcement vehicle provided with mounting hooks, to which two waterproof panels are about to be affixed in accordance with a second embodiment of the invention.
Figure 4:
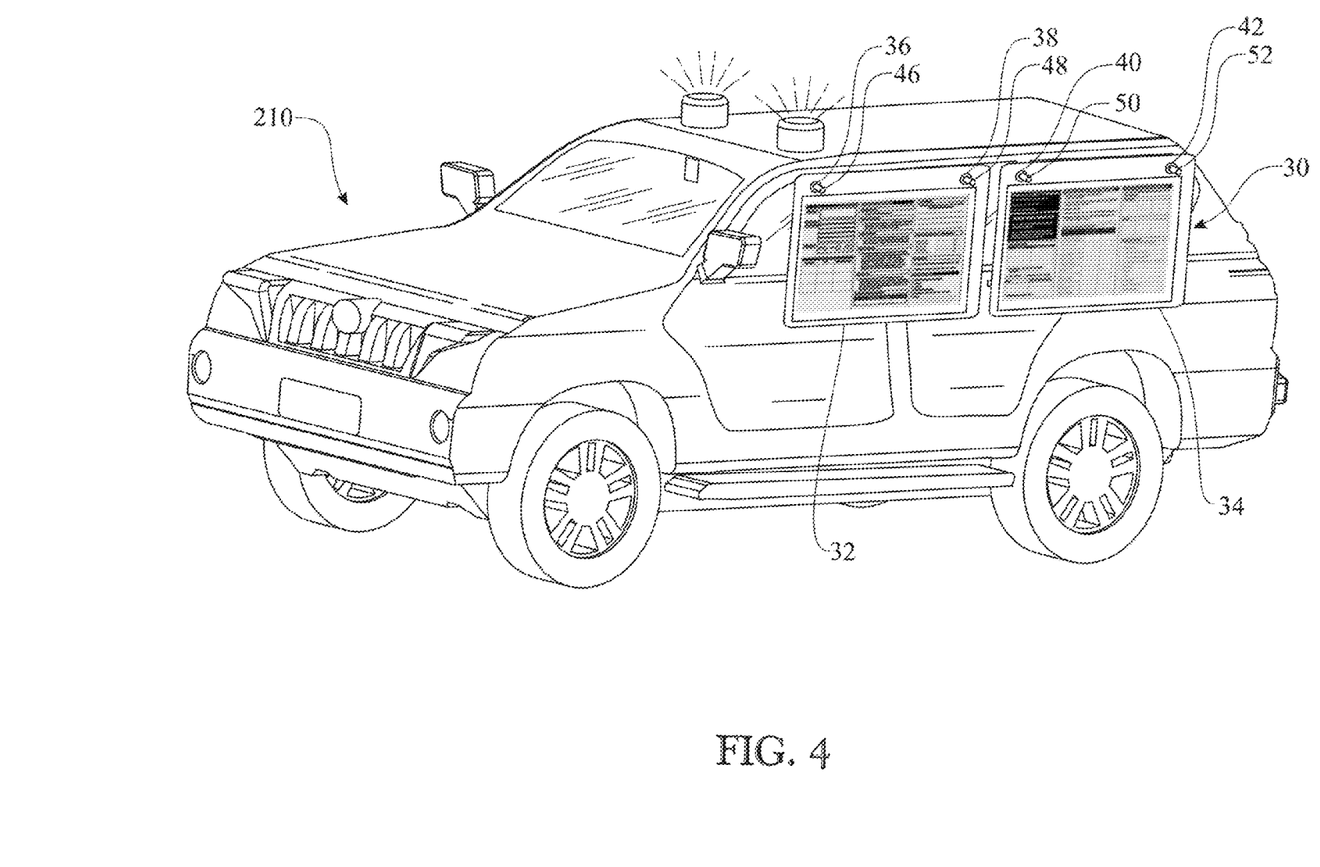
FIG. 4 presents an isometric view of the vehicle of FIG. 3, having hung the panels onto the compatible hooks comprised in the vehicle.

Referring now to FIGS. 3 and 4, another embodiment of system 30 of managing law enforcement critical incident operations at a scene of the critical incident is associated with a law enforcement vehicle 210. The system 30 includes a plurality of writable panels (two panels 32, 34, in the present embodiment). The panels 32, 34 can be provided with a suitable writable surface, such as a waterproof, laminated whiteboard. The panels 32, 34 are sized and configured so as to be readily transported to the scene of the critical incident, for example, in the trunk or storage area of the vehicle 210.

The panels 32, 34 contain relevant information related to a critical incident, to assist the commander in organizing operation planning by entering information into standardized formats. Such information includes, but is not limited to, diagrams, charts, operational objectives, checklists, reminders, names, and phone numbers, perimeters, subject information, information regarding injured victims and their locations, rally points, search patterns, and triage locations. The critical incident operation commander can read information on the panels in order to make decisions or provide instructions, and can write information on the panels in dependence of the feedback the commander receives from the officers.

Each of the panels 32, 34 includes attachment element 36, 38, 40, 42. In the embodiment illustrated in FIGS. 3 and 4, the attachment elements 36, 38, 40, 42 are provided as attachment apertures. The attachment apertures can include a perimetral grommet 37, 39, 41, 43, to increase panel resistance to tearing and thus make the panels 32, 34 more durable.

The system 30 includes a support assembly 44 for securing the panels 32, 34 to the vehicle 210. The support assembly 44 can be transported to the scene of the critical incident by virtue of being secured to the law enforcement vehicle 210. In alternative embodiments, the support assembly 44 can be removable, transported in the trunk of the vehicle 210 and only mounted on the outside of the vehicle 210 when the vehicle 210 has reached the scene of the critical incident. The support assembly 44 of the present embodiment includes a plurality of attachment hooks 46, 48, 50, 52. The attachment hooks 46, 48, 50, 52 are secured to the law enforcement vehicle 210 using any suitable attachment mechanism, either fixed (e.g., a hooked bolt) or removable (e.g., a suction cup with a hook), and are placed in positions so that they can be inserted into the attachment apertures 36, 38, 40, 42.

Once the law enforcement vehicle 210 is stationed at the scene of a critical incident, the panels 32, 34 are removed from the storage area of the vehicle V. The panels 32, 34 are then moved towards the attachment hooks 46, 48, 50, 52, such as in the direction of arrows A2, to insert the attachment hooks 46, 48, 50, 52 into the attachment apertures 36, 38, 40, 42, securing the panels 32, 34 in their in-use position as illustrated in FIG. 4.

Figure 5:
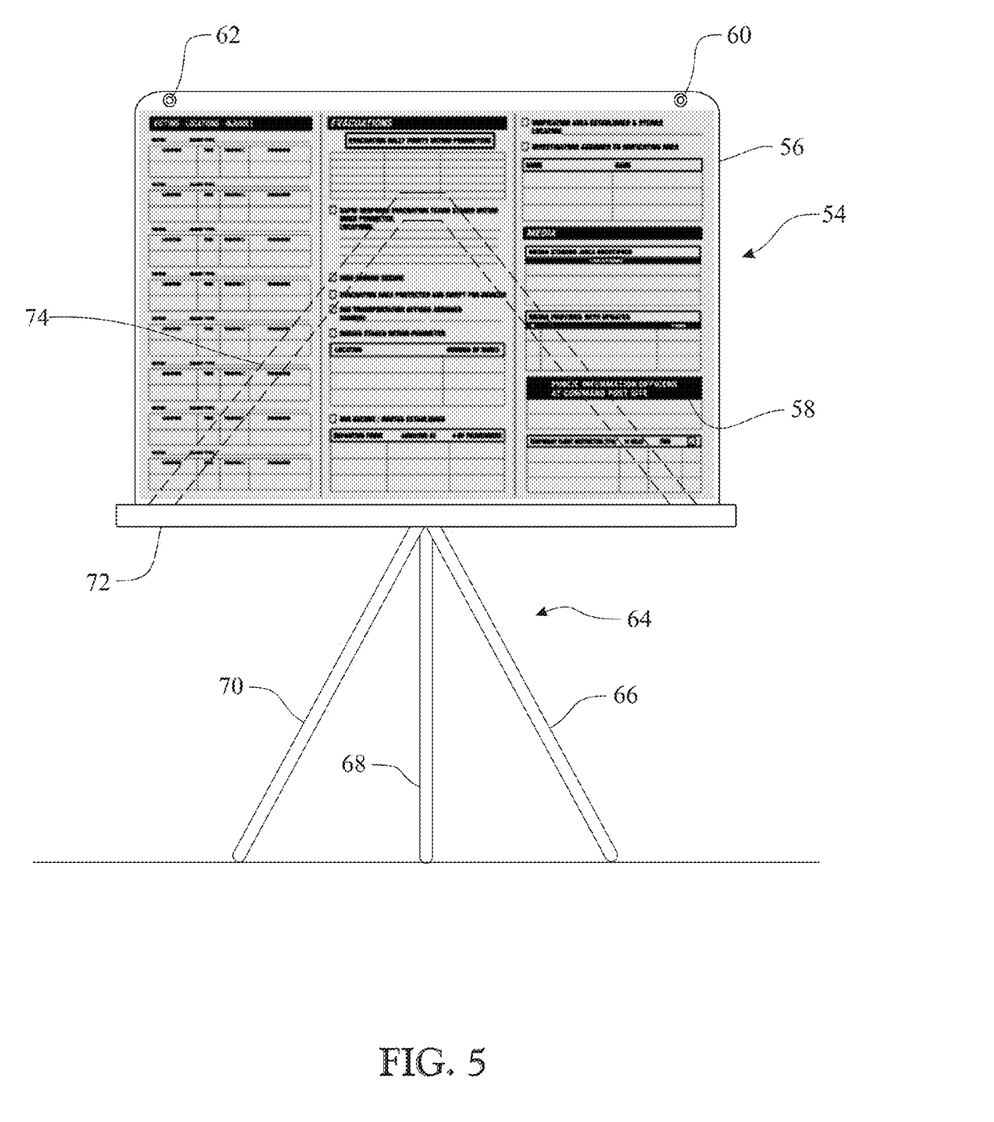
FIG. 5 presents a front elevation view of an exemplary waterproof panel in accordance with the invention, supported by a stand.

Referring now to FIG. 5, another embodiment of system 54 of managing law enforcement critical incident operations at a scene of the critical incident is shown. The system 54 includes a set of one or more writable panels, having represented one writable panel 56 in the figure. The panel 56 can be provided with a suitable writable surface, such as a waterproof, laminated whiteboard. The panel 56 is sized and configured so as to be readily transported to the scene of the critical incident, and preferably configured to be transported inside a vehicle without deforming; for example, the panel 56 can be transported in the trunk or storage area of the vehicle such as those described with reference to the embodiments of FIGS. 1-4.

The panel 56 contains relevant information related to a critical incident, to assist the commander in organizing operation planning by entering information into standardized formats. Such information can include, without limitation, diagrams, charts, operational objectives, checklists, reminders, names, phone numbers, perimeters, subject information, information regarding injured victims and their locations, rally points, search patterns, and triage locations. The critical incident operation commander can read information on the panels in order to make decisions or provide instructions, and can write information on the panels in dependence of the feedback the commander receives from the officers.

The panel 56 of the present embodiment is rigid. In addition, the panel 56 can include attachment elements 60, 62. In the present embodiment, the attachment elements 60, 62 are provided as attachment apertures, similarly to the panels 32, 34 of FIGS. 3 and 4.

The system 54 includes a support assembly 64 for securing the panel 56 in a writable and viewable position. The support assembly 64 is generally transported to the scene of the critical incident in the storage compartment of the law enforcement vehicle. The support assembly 64 includes a plurality of support legs (preferably three support legs 66, 68, 70) secured to a panel support ledge 72, and a rear support structure 74.

Once the law enforcement vehicle is stationed at the scene of a critical incident, the panel 56 and support assembly 64 are removed from the storage area of the vehicle. The support assembly 64 is erected, and the bottom of the panel 56 is placed on the support ledge 72 at a forward angle. The panel 56 is then swiveled rearward to lean on the support structure 74. Due to the panel 56 being rigid, the commander can easily write on the panel 56. In addition, rigidity keeps the panel 56 stably rested against the support structure 74. The fact that the panel 56 includes attachment elements 60, 62 allows the panel 56 to also be mounted onto a vehicle 200, 210 as explained heretofore with reference to FIGS. 1 through 4.

Figure 6:
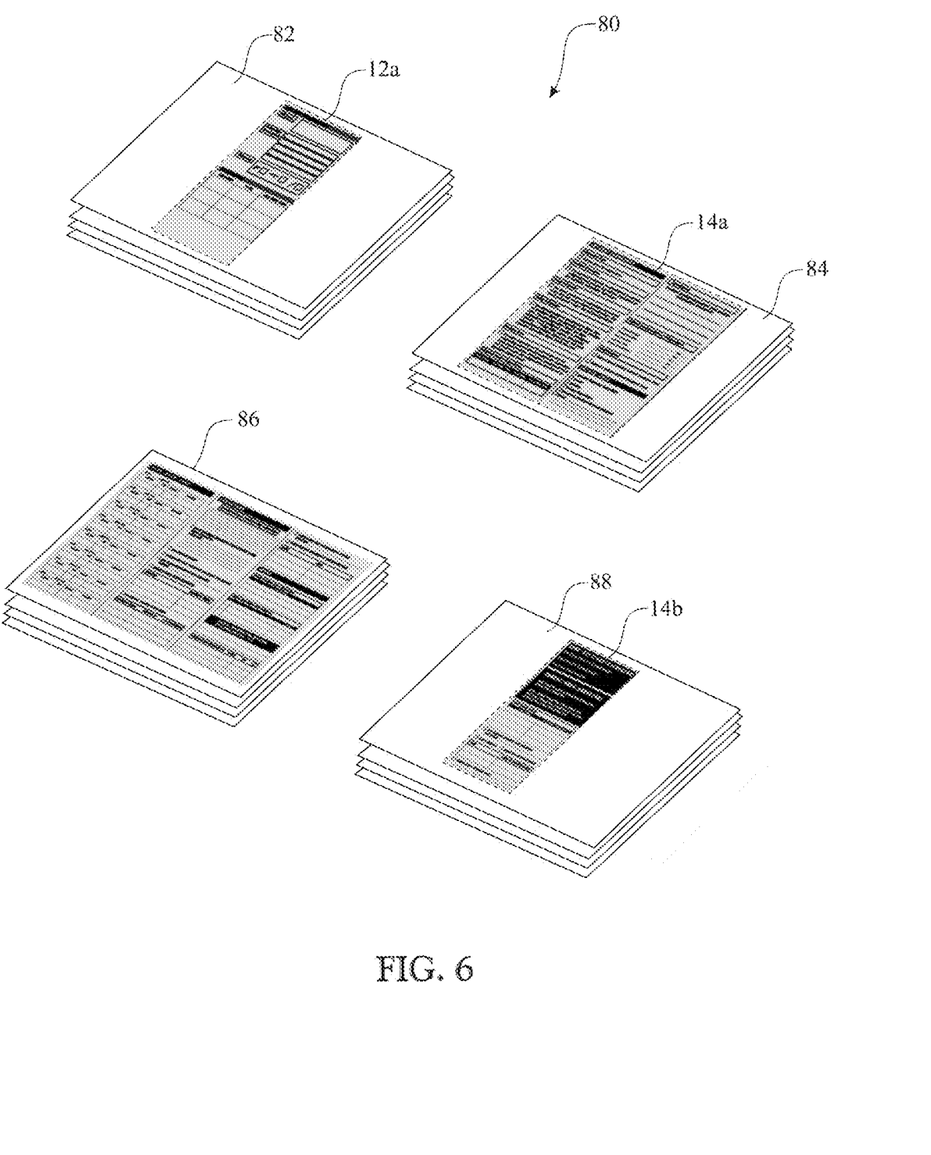
FIG. 6 presents an isometric view of a set of handheld, portable forms, complementary to the set of panels of FIG. 1.

Each of the systems 10, 30, 54 described with reference to FIGS. 1-5 includes a plurality of matching forms 80 as shown in FIG. 6. The forms 80 are associated with the writable panels, but presented in a smaller, hand-portable format, adapted and constructed to be transported and held in a readable position by an individual person using one hand only, and preferable made of paper and/or other writable material. Each of the forms 80 contains at least a part of the information contained on the at least one writable panel. In other words, the forms 80 can show an exact copy of an entire panel or an exact copy of part of a panel. For instance, with reference to FIG. 6, a first exemplary form 82 shows a copy of portion 12a of panel 12 of FIG. 1. A second exemplary form 84 shows a copy of portion 14a of panel 14 of FIG. 1. A third exemplary form 86 shows a copy of entire panel 16 of FIG. 1. Finally, a fourth exemplary form 88 shows a copy of portion 14b of panel 14 of FIG. 1. The critical incident response team may consist of various functional subgroups, such as tactical operations, crisis negotiations, hostage rescue, hazardous devices mitigation, critical incident intelligence, and surveillance and aviation. While the commander's panels include the over plan of critical incident response management, the forms 80 are divided into groups 82, 84, 86, 88 and contain information pertaining solely to the respective subgroups.

In the event that the panels are color-coded, the forms 80 can be color-coded to match the corresponding panel or part of a panel. For instance, portion 12a of panel 12 could be color-coded in blue both on the panel 12 and on the matching form 82; portion 14a of panel 14 could be color-coded in red on both the panel 14 and the matching form 84; and so forth. Matching color codes allow the commander to more rapidly receive feedback from the officers in stressful situations and copy the feedback onto the corresponding portion of the panels.

Figure 7:
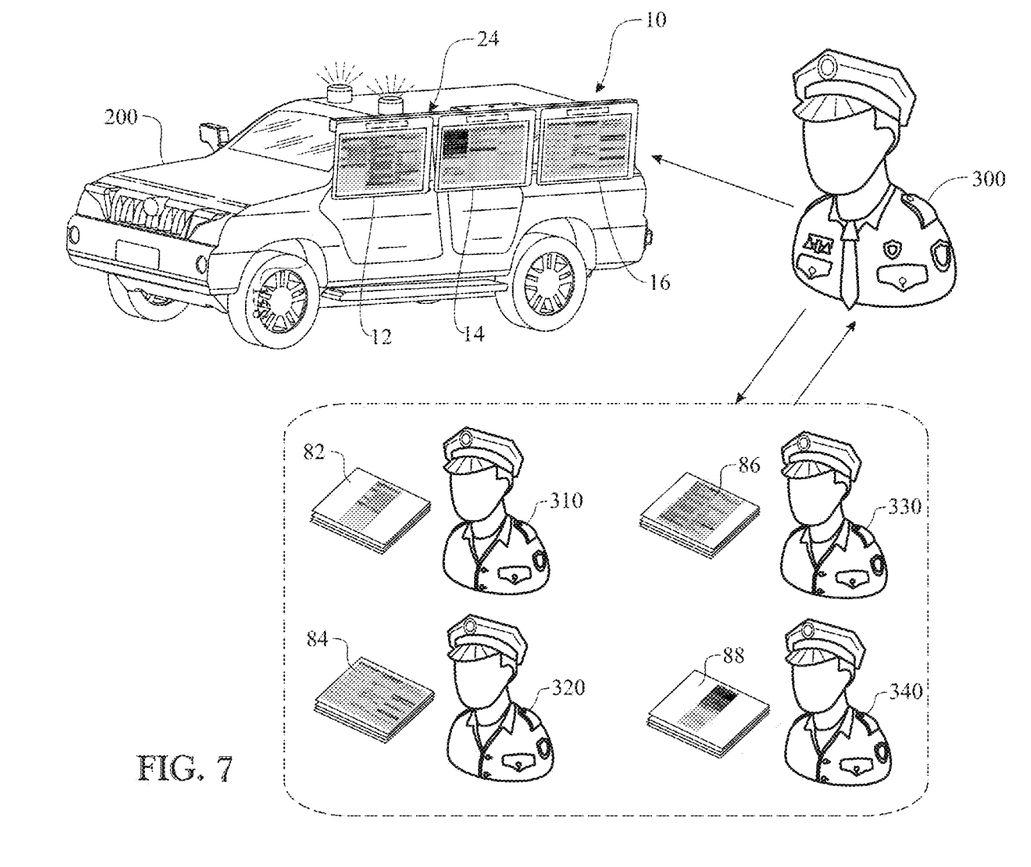
FIG. 7 presents a block diagram of the vehicle, supporting bar and panel configuration of FIG. 2 and the portable forms of FIG. 6 being used respectively by a commander and a set of law enforcement officers in order to carry out a critical incident operation, in accordance with the method of the present invention.

The illustration of FIG. 7 shows an example of operation of the system 10 of FIG. 1, including the forms 82, 84, 86, 88 of FIG. 6. The law enforcement vehicle 200 has been stationed at the scene of a critical incident, and the panels 12, 14, 16 have been secured to the support assembly 24. A critical incident operation commander 300 assesses the situation at the scene, and formulates a plan of action for dealing with the critical incident. The commander 300 then communicates his initial plan to a set of relevant officers 310, 320, 330, 340 and optionally enters information related to his initial plan on the writable panels 12, 14, 16. The commander then distributes transportable, writable forms 82, 84, 86, 88 to the relevant officers 310, 320, 330, 340 in correspondence with their specific assigned actions. Some officers 310, 320, 330, 340 may be in charge of actions related to a specific panel or part of a panel, whereas others may be in charge of actions related to another panel or part of a panel. Each officer 310, 320, 330, 340 can be provided with a form especially associated with that officer's assigned tasks, and/or with paper corresponding to the overall management plan. The officer uses the form to assist in following instructions, and uses the form to provide feedback to the commander. The fact that the forms 82, 84, 86, 88 copy exact parts of the panels or entire panels enables the commander to rapidly and easily transfer the feedback onto the panels when needed.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for managing a critical incident operation for use at a remote incident site, said system comprising:
   a support unit comprising:
      a vehicle attachment portion attachable to an exterior of a vehicle, and
      an elongated beam attachable to said vehicle attachment portion comprising at least one panel mounting element;
   at least one panel having an attachment element, said at least one panel engageable to said elongated beam by:
      a magnetic attachment between a magnetic material comprised in said at least one panel mounting element and at least one of a compatible magnetic material and a compatible ferrous material comprised in said attachment element, or
      a magnetic attachment between a ferrous material comprised in said at least one panel mounting element and a compatible magnetic material comprised in said attachment element, wherein
   said at least one panel further comprises a writable surface, wherein at least a portion of said writable surface has printed thereon relevant information to critical incident management; and
   a plurality of portable forms, sized smaller than said at least one panel, wherein each said form has printed thereon a reproduction of a subset of the relevant information to critical incident management printed on a corresponding specific panel of said at least one panel.

2. The system for managing a critical incident operation according to claim 1, wherein said at least one panel is sized to fit in a vehicle.

3. The system for managing a critical incident operation according to claim 1, wherein said at least one panel is waterproof.

4. The system for managing a critical incident operation according to claim 1, wherein said critical incident management information on said at least one panel is color-coded, and further wherein said information subset on each said form is color-coded to match the relevant information to critical incident management printed on said corresponding specific panel.

5. The system for managing a critical incident operation according to claim 1, wherein said relevant information includes at least one of the group consisting of diagrams, charts, operational objectives, checklists, reminders, names, phone numbers, perimeters, subject information, information regarding injured victims and their locations, rally points, search patterns, and triage locations.

6. The system for managing a critical incident operation according to claim 1, wherein said elongated beam is removable from said vehicle attachment portion.

7. A system for managing a critical incident operation for use at a remote incident site, said system comprising:
   a support unit comprising:
      a vehicle attachment portion attachable to an exterior of a vehicle, and
      an elongated beam attachable to said vehicle attachment portion comprising at least one panel mounting element;
   at least one panel having an attachment element, said at least one panel engageable to said elongated beam by one or both of the following:
      a magnetic attachment between a magnetic material comprised in said at least one panel mounting element and at least one of a compatible magnetic material and a compatible ferrous material comprised in said attachment element, and
      a magnetic attachment between a ferrous material comprised in said at least one panel mounting element and a compatible magnetic material comprised in said attachment element, wherein
   said at least one panel further comprises a writable surface, wherein at least a portion of said writable surface has printed thereon relevant information to critical incident management; and
   a plurality of portable forms, sized smaller than said at least one panel, wherein each said form has a writable form surface having printed thereon a reproduction of a subset of the relevant information to critical incident management printed on a corresponding specific panel of said at least one panel; wherein
   said at least one panel can adopt an installed position on said support unit in which said at least one panel is arranged in an upright position.

8. The system for managing a critical incident operation according to claim 7, wherein said at least one panel s waterproof.

9. The system for managing a critical incident operation according to claim 7, wherein said critical incident management information on said at least one panel is color-coded, and further wherein said information subset on each said form is color-coded to match the relevant information to critical incident management printed on said corresponding specific panel.

10. The system for managing a critical incident operation according to claim 7, wherein said relevant information includes at least one of the group consisting of diagrams, charts, operational objectives, checklists, reminders, names, phone numbers, perimeters, subject information, information regarding injured victims and their locations, rally points, search patterns, and triage locations.

11. A method for managing a critical incident operation at a remote incident site, said method comprising the steps of:

acquiring a critical incident management system including:

a support unit comprising at least one panel mounting element;

at least one panel having an attachment element, said attachment element engageable to at least one panel mounting element of said support unit, said at least one panel further having a writable surface wherein at least a portion of said writable surface has printed thereon relevant information to critical incident management; and a plurality of portable forms, sized smaller than said at least one panel, wherein each said form has printed thereon a reproduction of a subset of the relevant information to critical incident management printed on a corresponding specific panel of said at least one panel;

transporting the critical incident management system in a law enforcement vehicle to the scene of a critical incident;

mounting the at least one panel onto the at least one panel mounting element of the support unit;

distributing said plurality of portable forms to relevant law enforcement personnel;

identifying a section of a specific form of said plurality of portable forms distributed to relevant law enforcement personnel as having been partially or fully completed by a writing on said section, the writing carried out by said relevant law enforcement personnel;

identifying a destination panel among said at least one panel, said destination panel comprising printed relevant information to critical incident management of which said section of said form is a reproduction thereof; and reproducing said writing on said section onto said destination panel, by writing on said printed relevant information to critical incident management provided on said writable surface of said destination panel in correspondence with said writing on said section.

* * * * *